United States Patent Office 2,970,187
Patented Jan. 31, 1961

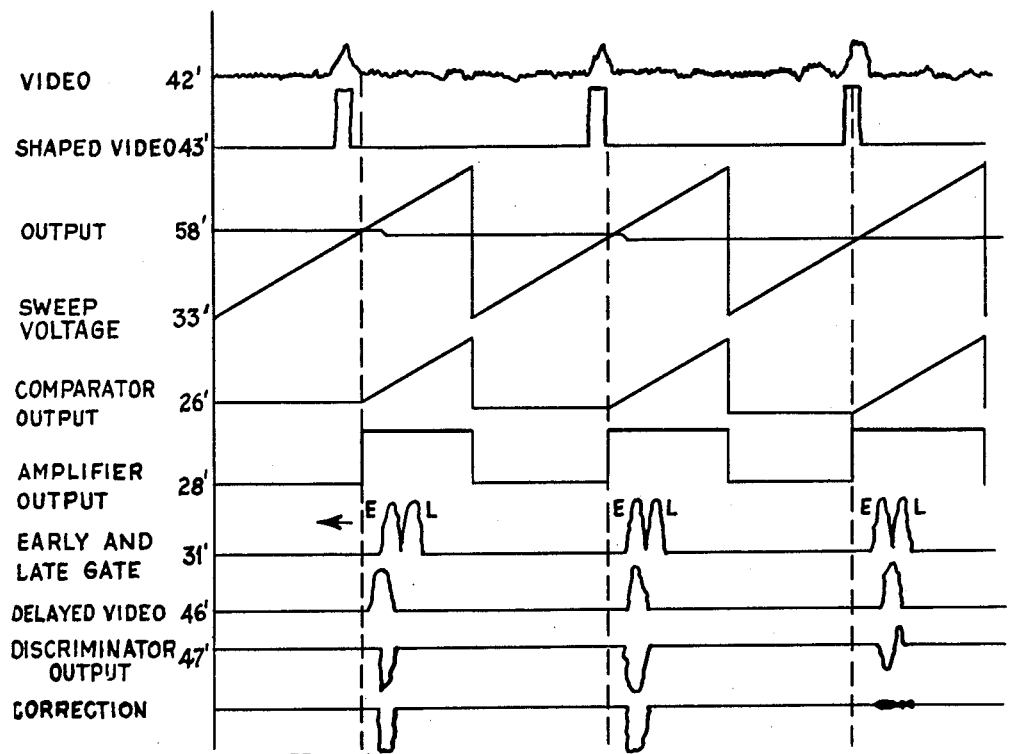
Fig. 4 CONVERSION UNIT WAVE FORMS
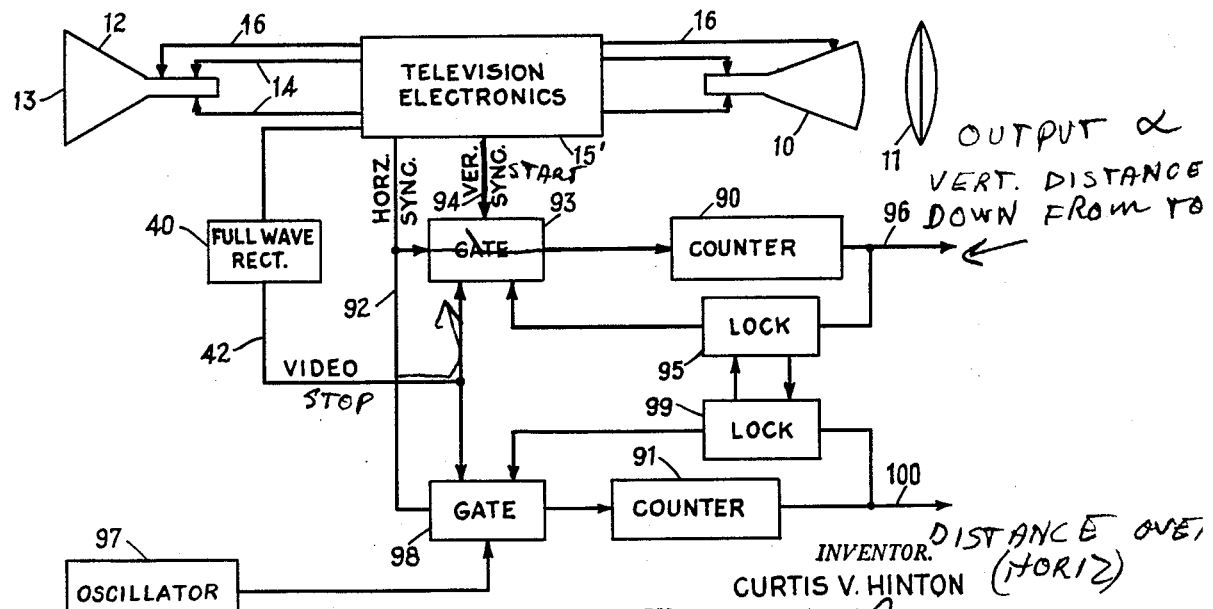
Fig. 5

2,970,187
PASSIVE AUTOMATIC TRACKING DEVICE

Curtis V. Hinton, Cincinnati, Ohio, assignor to the United States of America as represented by the Secretary of the Navy Filed Jan. 30, 1956, Ser. No. 562,354

9 Claims. (Cl. 178—6.8)

(Granted under Title 35, U.S. Code (1952), sec. 266)

The invention described herein may be manufactured and used by or for the Government of the United States of America for governmental purposes without the payment of any royalties thereon or therefor.

This invention relates to a passive automatic tracking device and more particularly to a closed-loop television system having a camera tube and a cathode ray tube for picking up and displaying a target in the cone of view of the camera tube with associated manual control means and conversion electronic network means for producing a visual cursor display on the cathode ray tube and, at the same time, for producing output intelligence of target position for enabling personnel, or for use in remote equipment, to follow the target.

In this invention the camera tube may be positioned for "seeing" a target area as on a gun mount, at an observing station, or at a search light station, for examples, carried by a vehicle, or fixed stationary. The cathode ray tube may be positioned at any place convenient for fire control personnel or other observer personnel. A manual control means in the form of a joystick is operative under one selected condition of the system to control a cursor display such as a donut-shaped spot on the cathode ray tube and in another selected condition of the system the cursor spot is controlled automatically by conversion electronic networks to track a target appearing on the cathode ray tube. This same cursor tracking intelligence may be used to control fire control equipment, or for fire control or other personnel, to effect the tracking and elimination or observation of a target. By this system fire control personnel at a station or on a vehicle carrier, for example, may at all times passively follow the target and control firing accordingly on the target. It is therefore a general object of this invention to provide an automatic passive target tracking system having means for producing a selectively manual or automatic visual tracking indication of the target being tracked and for producing target position information for use by other personnel or in other remote equipment in following the target.

These and other objects, advantages, features, and uses may become more apparent as the description proceeds when considered along with the accompanying drawings in which:

Figure 4 is a graphic illustration of the waveforms produced through one of the conversion electronic networks; and Figure 5 illustrates in block and function wiring diagram another embodiment of Figure 1 using digital counter circuits.

Figure 1:
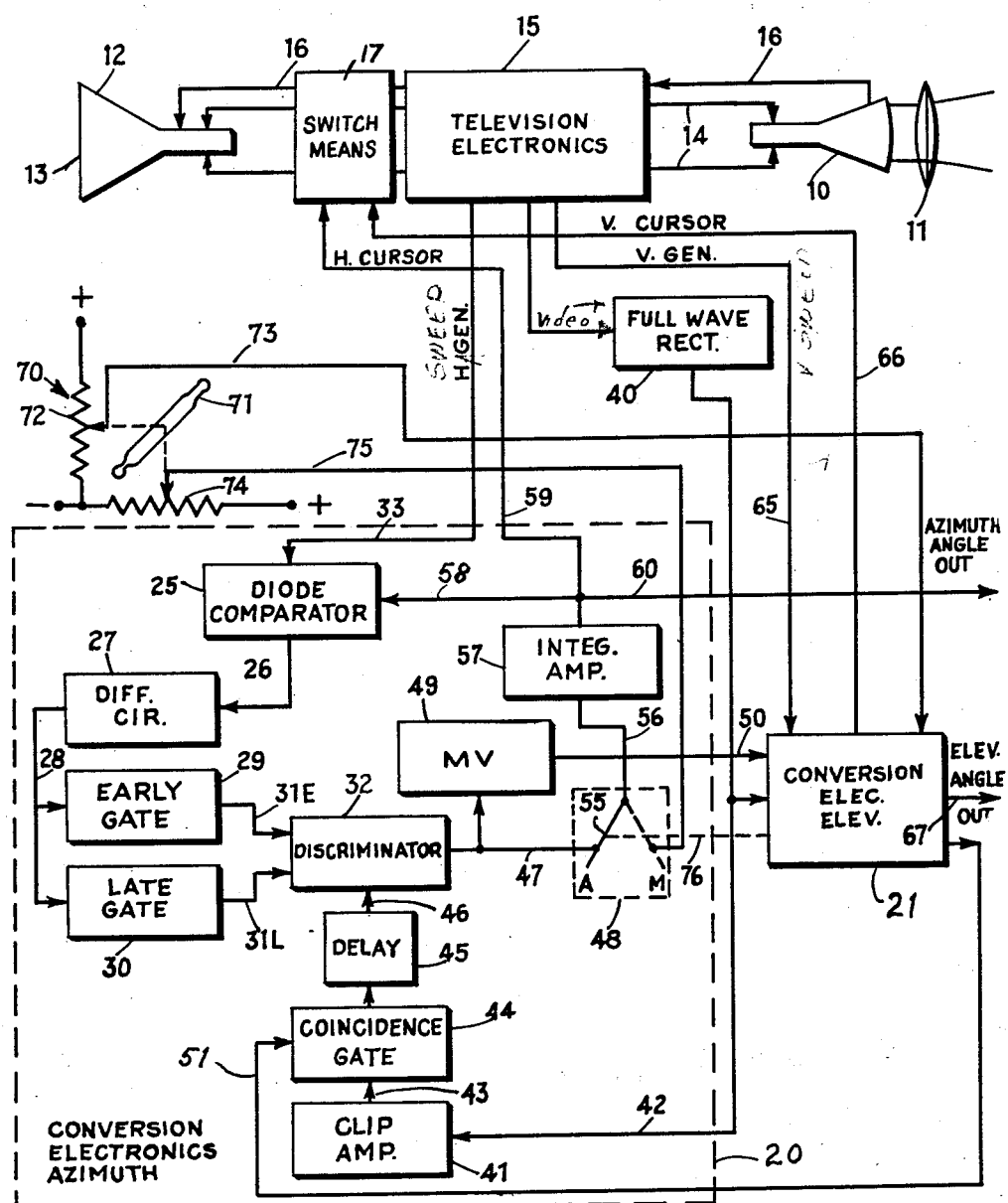
Figure 1 is a block diagram of the passive tracking system illustrating the circuit couplings functionally.

Referring now more particularly to Figure 1, a closed-loop television system is shown having a camera tube 10 with its associated optical system 11 and a cathode ray tube 12 with a fluorescent face 13 thereon each being supplied horizontal and vertical sweep voltages through the conductors 14 from a television electronics network 15 in the usual and ordinary manner. The television electronics network 15 referred to herein includes the electronic components necessary in effecting the closed-loop system such as voltage supplies, deflection circuits, focusing circuits, horizontal and vertical generating circuits, synchronizing circuits, detector circuits, et cetera, as is well understood by those skilled in the television and cathode ray tube art. Such closed-loop television circuits are of the type disclosed in U.S. Patents to H. O. Marcy III, No. 2,534,610, and P. J. Herbst, No. 2,581,589. The video signal from the camera tube 10 is transmitted via the conductor means 16 through the television electronics network 15 to the cathode ray tube 12 in the usual and well understood manner. A switch means 17 is illustrated in the leads 14 and 16 between the television electronics 15 and the cathode ray tube 12 to enable the presentation of target information by time sharing as will hereinafter become clear. The cathode ray tube 12 may be of the double gun type, or it may be of the single gun type with a time-sharing circuit incorporated in the television electronics network 15, in order to produce a double display on the screen 13 in a manner well understood in the art. One display is that of the target or targets picked up by the camera tube 10 and the other display is that of a doughnut-shaped cursor spot produced by electronics in the television electronics network 15 and controlled by either manual means or conversion electronic means, soon to be described. The television electronics network 15 further includes a marker generator capable of producing a circular cursor or "doughnut" display on the picture tube screen in a well known manner. Such a cursor display is produced by applying two equal sine wave voltages in out-of-phase relation to the horizontal and vertical deflection circuits of a cathode ray tube to produce one of the patterns known as "Lissajou's" figures. Such a marker display is maneuverable over the face of the cathode ray tube by varying the biasing voltages or "centering circuits" of the horizontal and vertical deflection circuits. The size of the marker display is determined by the amplitude of the sine waves or voltage signals producing the marker. The production of such marker displays is well known in the art and may be accomplished in a manner set out in the U.S. patent to G. E. White, No. 2,419,239. The marker generator may be coupled to one gun deflection circuit if the cathode ray tube is of a double gun type, or it may be coupled to the deflection circuits through time-sharing switching means if a single gun cathode ray tube is used. The cathode ray tube may have deflection under the control of electrostatic or electromagnetic circuit means.

Coupled to the television electronic network 15 are two conversion electronic networks 20 and 21, the network 20 hereinafter being referred to as the azimuth conversion electronics and the network 21 hereinafter being referred to as the elevation conversion electronics. Since both conversion electronic networks are functionally identical, only one will be described herein, the network 20 being shown in block diagram for this purpose.

Each conversion electronic network includes a diode comparator circuit 25 coupled by a conductor means 26 to a differentiating circuit 27, the output of which differentiating circuit is by a conductor means 28 connecting in parallel an early gate circuit 29 and a late gate circuit 30. The output of each gate circuit is coupled to a discriminator circuit 32 through conductor means 31E and 31L, respectively. The diode comparator 25 has as one of its inputs by conductor means 33 the output of the horizontal sweep generator in the television electronic network 15 which produces the sawtooth waves for the deflection circuits of the closed-loop television system. The video signal is taken from the television electronic network 15 in a manner well understood in the art and passed through a full wave rectifier circuit 40 to a clipper-amplifier circuit 41 through the conductor means 42. The output of the clipper-amplifier is passed by conductor 43 as one input to a coincidence gate circuit 44. The output of the coincidence gate 44 is passed through a delay circuit 45 via a conductor means 46 as another input to the discriminator circuit 32. The output of the discriminator circuit is coupled by a conductor 47 to one contact A of a single-pole-double-throw switch 48 and by a branch conductor to a multivibrator circuit 49. The output of the multivibrator circuit 49 is impressed via a conductor 50 on a coincidence gate in the elevation conversion electronic network 21 which coincidence gate is identical to the coincidence gate 44. The output of a multivibrator circuit in the elevation conversion electronic network 21, which corresponds to the multivibrator 49, is coupled through the conductor means 51 to the coincidence gate 44, the reason for which will become clear from the description of operation to follow herein. The switch blade 55 of the switch 48 is coupled by the conductor 56 through an integrating amplifier circuit 57 to branch conductors 58, 59, and 60, the branch conductor 58 being coupled as the second input to the diode comparator 25, the branch conductor 59 being coupled to the picture tube horizontal deflection circuits of the closed-loop television system through the switch means 17 to provide the cursor control, and the branch conductor 60 being coupled to an output terminal over which the output azimuth voltage signals are conducted. Similar circuits are provided between the television electronic network 15 through the switch means 17 to the vertical deflection circuits of the picture tube and the elevation conversion electronic network 21, the vertically generated voltages coming by way of the conductor means 65, the cursor signals being conducted by the conductor means 66, and the elevation output voltage signals being conducted by the conductor 67.

A manual control means, generally referred to by the reference character 70, includes a pair of potentiometers, one for each axis, and each being controlled by a single joystick 71. The potentiometer producing the vertical control voltage is designated by the reference character 72 and is coupled by the conductor 73 to the right hand contact M of a switch, corresponding to switch 48, in the elevation conversion electronic network 21. A potentiometer 74 is coupled by the conductor 75 to the right hand contact M of the switch 48 for providing azimuth signal voltages for the azimuth conversion electronic network 20. The single-pole-double-throw switch 48 has the switch blade 55 mechanically, but insulatingly, coupled by a coupling means 76 to switch blade of the corresponding single-pole-double-throw switch in the elevation conversion electronic network 21 to provide a compound switch 48, as hereinafter referred to herein. While the compound switch 48 is illustrated as being within both conversion electronic networks herein, it is to be understood that this compound switch may in actual practice be placed at any convenient place for fire control personnel to manually operate, one very convenient place being on the handle of the joystick 71.

Figure 2:
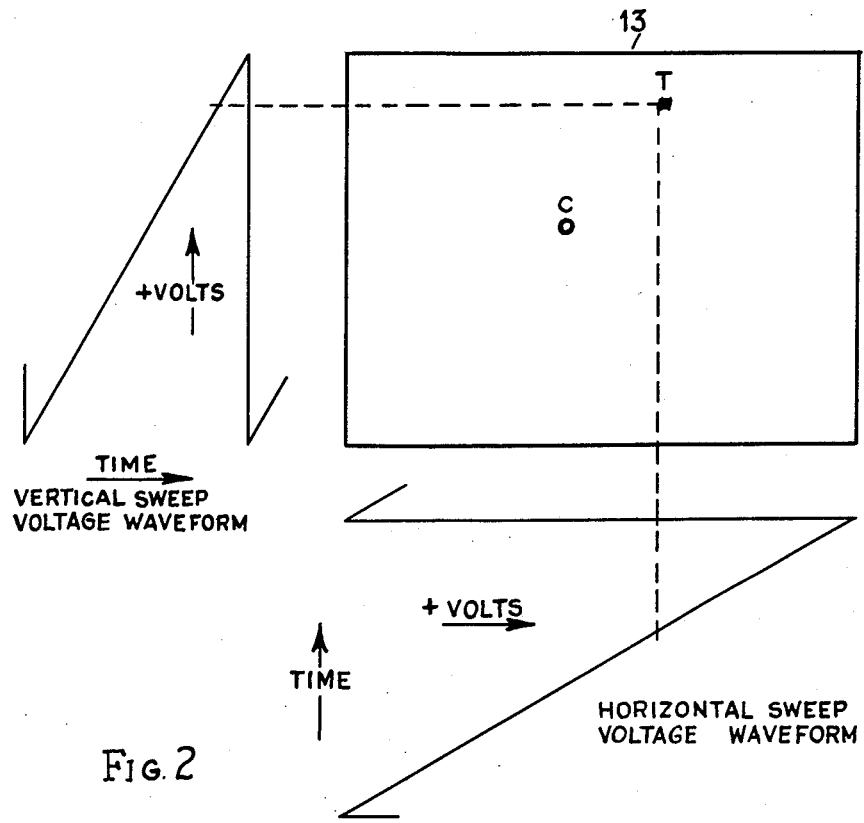
Figure 2 is an illustration of the cathode ray tube screen with adjacent electronic sweep waveforms and illustrating a target position.

As illustrated in Figure 2, the fluorescent screen 13 of the cathode ray tube 12 is shown with a vertical sweep voltage waveform and a horizontal sweep voltage waveform in adjacent related positions. A target is illustrated at T and the cursor spot is illustrated at c. The television system and related networks disclosed above for Figure 1 provide the means for developing voltage signals in azimuth angle proportional to the instantaneous horizontal sweep voltage of the target T and for developing voltage signals in elevational angle proportional to the instantaneous value of the vertical sweep voltage, the coincidence of these two instantaneous voltage values being the position of the target T on the screen 13. The target T position on the screen 13 is that of the target position on the camera tube 10. To develop the azimuth and elevation voltage signals of target position the cursor spot c must be superimposed over the target spot T, either by the manual means or the automatic means, as will hereinafter be made clear in the description of operation of the device.

Figure 3:
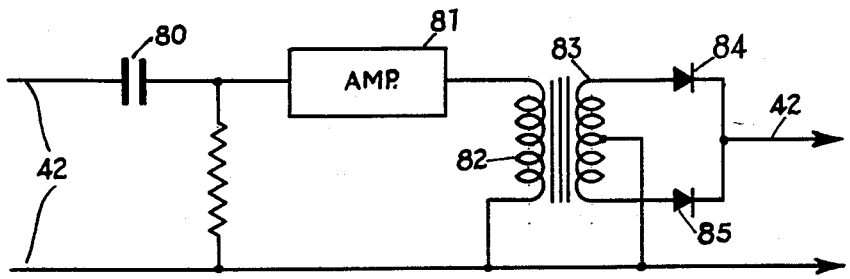
Figure 3 is a circuit diagram of the full wave rectifier shown in Figure 1.

The full wave rectifier 40 is more particularly illustrated in Figure 3 wherein the video input signal by the conductor 42 is transmitted through a condenser 80, through an amplifier circuit 81, and through the primary 82 of a transformer coupling. The secondary 83 of the transformer has its opposite terminals each coupled through rectifying means 84 and 85 to continue the video circuit through the conductor 42 as disclosed for Figure 1. The secondary 83 is center tapped to the ground conductor to provide full wave rectification of the video signal by the rectifying means 84 and 85. As may be well understood in the art, a video signal may have a voltage above and below a "grey" level which results from targets that are either reflecting light above or below the "grey" level established by the camera tube 10. This rectifier means rectifies these positive and negative video signals for use in the clipper amplifier 41, coincidence gate 44, and discriminator circuit 32. Figure 3 is illustrative only of a full wave rectifier that may be used although it is to be understood that any suitable full wave rectifier means may be used in this video circuit.

In the operation of the device, the closed-loop television system is arranged to "see" a cone of target area and any target being picked up by the camera tube 10 will be displayed on the screen 13 of the cathode ray tube 12. With the compound switch 48 positioned with the switch blades 55 to the right, or manual position M, a cursor doughnut-like spot will appear on the screen 13 of the cathode ray tube 12 in correspondence with the horizontal and vertical voltages picked up from the potentiometers 74 and 72, respectively. Manual tracking of the target may be accomplished by control of the joystick 71 to position the cursor spot at any place on the screen 13. The cursor spot is positioned to encircle the target at which time the compound switch 48 may be switched to its other contact position A placing the two conversion electronic networks 20 and 21 into operative position to automatically maintain the cursor spot over the target displayed on the screen 13 of cathode ray tube 12.

Referring to both Figures 1 and 4, wherein the several waveforms are identified by primed reference characters corresponding to the conductor means carrying these voltages, the video signal coming via the conductor 42 is shown at the top of Figure 4, after rectification, as the waveform 42'. This video signal is clipped and amplified, as shown in Figure 4, as the shaped video signal 43' being passed to the coincidence gate 44. The sweep voltage from the television electronic network 15 being conducted by the conductor 33 to the diode converter 25 is shown in Figure 4 as a sawtooth waveform 33'. The output of the integrating amplifier 57 via conductor 58 to the diode comparator is also shown at 58' as compared with the sawtooth waveform 33', the development of the output voltage over the conductor 58 which will soon be described. The output waveform 26' of the diode comparator 25 is shown in Figure 4 as a part of the sawtooth waveform 33' above the voltage level of the voltage 58'. This waveform 26' is passed through the differentiating amplifier circuit 27 which produces a square wave 28' on the output conductor 28. The conductor 28 being coupled in parallel to the early and late gates 29 and 30, respectively, produces waveforms 31'E and 31'L in the output conductors 31E and 31L, respectively, for conduction to the discriminator circuit 32. The delayed video signal coming by way of conductor 42 through the clipper amplifier 41, coincidence gate 44, and delay circuit 45 produces a waveform 46' in the conductor 46 to the discriminator circuit 32, this video signal 46' being delayed in time with respect to the early and late gates an amount midway between the voltage waveforms E and L when the leading edge of the voltage wave 28' coincides with the leading edge of wave 43'. The discriminator 32 is a coincidence gate for the outputs of the early and late gates 31E and 31L, respectively, and the delayed video signal output 46. The delayed video signal voltage 46' being designed in the circuitry to be the mean voltage signal between the early and late gate voltage signals will cause a positive and negative voltage signal of equal amplitude which will be nill whenever the video signal coming by way of conductor 46 is exactly between the voltage signals coming from the early and late gates. That is, there will be no output from the discriminator 32 in the conductor 47 unless there is an input from either of the early or late gates 29 or 30. The output of discriminator 32 on the conductor 47 is negative if the video signal coming by way of conductor 46 coincides with the voltage input coming from the early gate by way of the conductor 31E; and conversely, the output of the discriminator will be positive when the inputs over conductors 46 and 31L coincide in voltage amplitude. In Figure 4, the waveform 47' illustrates two examples of the former condition and one example where the video signal is the exact mean of the early and late gate signals. The integrating amplifier 57 is a device constructed in such known manner that when the compound switch 48 is in the manual position M the output voltage of the potentiometer control 70 is impressed through the amplifier 57 to the branch conductors, 58, 59, and 60. When the compound switch 48 is moved to the automatic position A, the output of the amplifier 57 will tend to remain constant. When a voltage appears on the output of the discriminator 32, the output of amplifier 57 changes by an amount proportional to the time integral of the discriminator 32 output. Therefore, the correction, illustrated graphically in Figure 4, which is positive or negative, depending on the video coincidence with the early and late gate signals, will be zero when the video is centered between the two gates. Figure 4, in the lowermost graph, illustrates the correction graphically resulting from the above examples. This output of the integrating amplifier 57 is illustrated in Figure 4 by the waveform 58' with the intersection thereof with the sweep voltage waveform 33' to produce the leading edge of the comparator output waveform 26' and the differential amplifier output waveform 28' shown in Figure 4 as beginning at a dotted line representative of time. Negative voltage then will pull the output voltage wave 58' downwardly which causes the comparator and amplifier output waves 26' and 28' to be moved to the left in Figure 4 which would pull the early and late gate voltage signals 31'E and L to the left, as shown by the arrow, until the delayed video signal is the exact mean of the early and late gate voltage signals. This will produce a correction to the voltage output on the branch circuits 58, 59, and 60 so that this voltage becomes proportional to the target position in azimuth. The output over the branch conductor 58 is used to automatically produce the correction voltage through the diode comparator circuit 25, the voltage in the branch circuit 59 is applied to the cursor circuits through the switch means 17 to position horizontally the cursor display over the target horizontally on the screen 13 of cathode ray tube 12, and the voltage in the branch conductor 60 is applied to an output terminal for any desirable use in controlling gun fire control circuits, for azimuth information in the control of gun fire control circuits, or for other use.

The elevational conversion electronic network 21 is identical to the azimuth conversion electronic network 20 with the exception that the network 21 has the vertical generated sweep voltages applied thereto instead of the horizontal generator sweep voltages as described for network 20. The elevational conversion electronic network 21 therefore produces a cursor voltage output through the conductor 66 to the switch means 17 to position the cursor spot vertically on the screen 13 of cathode ray tube 12 proportional to the target in the elevational axis. The voltage for the vertical or elevational angle appears on the output conductor 67 whereby the output voltages on the conductors 60 and 67 may be used for controlling a gun turret or the like in both azimuthal and elevational directions, for example.

The multivibrator circuit 49 is triggered from the output of the discriminator 32 to provide a pulse corresponding in time and having a pulse width corresponding to the desired angular width of selectivity of the target which pulse is conducted by the conductor 50 to the coincidence gate in the network 21. The multivibrator pulse is effective in the coincidence gate to allow consideration of the video signal in the perpendicular axis to pass through the discriminator only when the target is near the position being tracked. This will eliminate other targets interfering with the tracking of a particular target. The multivibrator 49 controls the coincidence gate in the network 21 while a similar multivibrator in the network 21 controls the coincidence gate 44 in the network 20.

It may be seen from the above description that operator personnel, upon the appearance of a target on the screen 13, can manually track the target with the manual cursor control means 70 when the compound switch 48 is thrown to the right or manual postion M. After the cursor is manually superimposed over the target on the screen 13 the compound switch 48 may be switched to the left, or A position, thereby causing the cursor to automatically track the target. Automatic tracking of the target will produce output voltage signals on the conductors 60 and 67 to other equipment essential in the fire control defense of the station of the present equipment, or for other uses, as desirable. If at any time the target is lost as indicated on the screen 13, the compound switch 48 may be rethrown to the manual position M and the target again tracked manually.

Referring more particularly to Figure 5 there is shown another embodiment of a block and functional circuit diagram in conjunction with the closed-loop television system incorporating a digital network for providing coordinate intelligence of a target occurring in the television system. Like reference characters in this figure refer to like parts in Figure 1, except that the television electronics network, herein referred to by the reference character 15', does not need the switch circuit 17 in conjunction therewith. In the device of Figure 5 digital counters 90 and 91 are used for counting the horizontal and multiples of vertical sweeps in the raster of the cathode ray tube 12. The digital counter 90 counts the horizontal synchronization pulses produced in the television electronic network 15' and coming by way of the conductor 92 through a gate circuit 93 which gate circuit 93 is emmediately started by the vertical synchronizing pulses in the television electronic network 15' coming by way of the conductor 94 to open the gate 93. The gate circuit 93 is closed by the video signal coming by way of the conductor 42. The digital counter 90 has its output connected through a locking circuit 95, the output of which is also coupled to the gate circuit 93 to provide the selectivity of the target analogous to the multivibrator circuit in Figure 1. The digital counter circuit 90 will therefore count the number of horizontal lines from the beginning of the raster to the target position, this counted number being given on the output conductor 96.

The digital counter circuit 91 counts the pulses from an oscillator circuit 97 which are permitted to pass through a gate circuit 98. The digital counter 91 has a feed back locking circuit 99 to the gate circuit 98 corresponding to the locking circuit 95 of the digital counter 90. The two locking circuits 95 and 99 are inter-coupled so that the circuits are always locked on the same target. The horizontal synchronizing circuit is coupled to the gate circuit 98 by conductor 92 the synchronizing pulses of which open the gate circuit and the video pulses coming by conductor 42 are operative to close the gate circuit 98. The oscillator circuit 97 is locked in frequency to the horizontal frequency and has a frequency output of $$\frac{\text{Horizontal frequency}}{\text{Vertical frequency}} \times \text{horizontal frequency}$$

This ratio yields equal resolution on the two axes if a 1:1 aspect ratio is used. If other than a 1:1 aspect ratio is used or if unequal resolution is desired, the frequency ratio can be adjusted accordingly. The azimuth angle deviation is the digital count on the output conductor 100 of the counter 91 equal to the number of pulses the oscillator 97 passed through the gate 98. This pulse count provides the exact azimuth position of the target along the raster horizontal lines presented on the screen 13. The intelligence coming from the digital counters by way of the conductors 96 and 100 may then be used for fire control personnel or other personnel in exactly positioning the target in the "sight" cone of the camera tube 10.

The presently available industrial equipment will yield about 600 lines of screen using a small camera tube, such as a 16 millimeter tube, but will yield about 1000 lines for 35 millimeter camera tube. For the smaller camera tube and substantially large angle of view of the camera tube it is considered that no more of an error than .26 of a degree will exist and for the large tube no more than about .22 of a degree will exist. Because the output is independent of the linearity and amplitude variations of the sweep the value of .2 percent conversion accuracy may be conservative.

The accuracy calculations given for a system having no moving parts in the scanning unit or camera tube may be increased, where desirable, by gimbaling the camera tube and reducing the angular conversion of the optical system 11. This is effected by finer scanning resolution and by the fact that, with the same percent accuracy in conversion it results in decreased angular error.

It may be understood that the camera tube may be constructed for infrared spectrum response wherein the above systems may be used for daylight as well as night target observation.

While many changes in constructional details and features may be made in practicing this invention within the scope and spirit of the invention, I desire to be limited only by the scope of the appended claims.

I claim:

1. A passive automatic tracking television device comprising; a closed-loop television system including a camera tube in fixed position to have a cone of view over a target area, a picture tube, and an electronic means for transmitting and displaying target signals picked up on the camera tube to the picture tube and including a circular trace generator for producing a circular cursor display on the picture tube simultaneously with target signal displays; circuit means coupled to said electronic means to receive horizontal sweep, vertical sweep, and video voltage signals from the electronic means producing picture tube scan for developing intelligence signals proportional to the instantaneous position of the electron beam during the horizontal sweep voltage and the instantaneous position of the electron beam during the vertical sweep voltage at the intersection of the horizontal and vertical sweep voltages on said picture tube of a target picked up by said camera tube and transmitted to said picture tube with respect to a reference line concentric with the cone of view of said camera tube.

2. A passive automatically tracking television device as set forth in claim 1 wherein said circuit means includes a pair of conversion electronic networks, one for each horizontal and vertical axis, each conversion electronic network converting sweep generator voltages and target signal voltages for that axis into a direct current voltage coupled to the deflection circuit bias of said circular trace generator for said electronic means for actuating said circular cursor display over the target, each direct current voltage also being coupled to an output circuit.

3. A passive automatically tracking television device as set forth in claim 1 wherein said circuit means includes gating and counting networks coupled to the horizontal and vertical synchronizing circuits of said electronic means for gating and counting the number of horizontal and vertical lines drawn on said picture tube between the start of the vertical sweep and the target position transmitted thereto from said camera tube, said count gated by said gating circuits corresponding to the voltage levels of each horizontal and vertical sweep voltage at the position of the target.

4. A passive automatic tracking television device comprising; a closed-loop television system including a camera tube, a picture tube, and an electronic means for transmitting and displaying target signals picked up on the camera tube to the picture tube and including a circular marker generator for producing a circular marker cursor display on the picture tube screen to appear as a simultaneous display with target signal displays; manual means for producing voltages proportional to the azimuth and elevation of a point adaptable when applied to the horizontal and vertical deflection biasing circuits of the picture tube in the electronic means positions said cursor display on said picture tube; circuit means coupled to said electronic means for producing automatically voltages proportional to the instantaneous value of each horizontal sweep voltage and vertical sweep voltage at the intersection of the horizontal and vertical sweep voltages at the position of a target display on the picture tube screen scan for positioning, when applied to the horizontal and vertical deflection bias currents of the picture tube in said electronic means, said cursor display on the picture tube; a switching means coupled to said manual means, said circuit means, and said television system for alternately switching said voltages produced by said manual means and said circuit means to position said cursor display on said picture tube; and means between said switching means and said television system for providing azimuth and elevation voltage outputs whereby the target and cursor relation are continuously viewed on the picture tube in the cone of view of the camera tube.

5. A passive automatic tracking device as set forth in claim 4 wherein said circuit means consist of two conversion electronic networks one for each azimuth and elevation voltage produced, each conversion electronic network including circuits to compare the time of occurrence of a video signal pulse after the start of a given sweep and a pulse generated when the sweep ramp voltage rises above the output position voltage.

6. A passive automatic tracking device as set forth in claim 5 wherein said manual means includes a universally mounted control means mechanically coupled to control a pair of variable voltage divider means, one for each azimuth and elevation axis.

7. A passive automatic tracking device as set forth in claim 6 wherein the conversion electronic networks comprise diode comparator circuits, each to compare a voltage level of the sweep voltage at the instant of a target video signal with the output position voltage in each axis, said position voltage being adjusted so that it becomes and remains proportional to the target position.

8. A passive automatic tracking device as set forth in claim 7 wherein said conversion electronic networks each include means for comparing a voltage level of only one video target signal to the exclusion of all other video target signals.

9. A passive automatic tracking device as set forth in claim 4 wherein said circuit means coupled to said electronic means includes, for each axis, a diode comparator having its output coupled through a differentiating amplifier circuit in parallel with early and late gating circuits to a discriminating circuit, a clipper amplifier circuit having the target signal of said electronic means as an input thereto, the output being coupled through a delay circuit to said discriminating circuit, the output of said discriminating circuit being coupled through said switching means in parallel to said diode comparator and to said electronic means, and a second input to said diode comparator being coupled to the generator of voltages for one axis in said television system whereby the voltage at the output of the discriminating circuit in each axis is the voltage level of the target signal in that axis, both voltages proving the means for positioning said cursor display on the picture tube of the television system and to provide said voltage output for external use.

References Cited in the file of this patent

UNITED STATES PATENTS

| | | |
|---|---|---|
| 2,231,929 | Lyman | Feb. 18, 1941 |
| 2,403,975 | Graham | July 16, 1946 |
| 2,419,239 | White | Apr. 22, 1947 |
| 2,612,637 | Rines | Sept. 30, 1952 |
| 2,717,999 | Lewinstein | Sept. 13, 1955 |
| 2,734,269 | Claret | Feb. 14, 1956 |
| 2,745,095 | Stoddard | May 8, 1956 |